United States Patent
Akhare

(10) Patent No.: US 12,435,595 B2
(45) Date of Patent: Oct. 7, 2025

(54) BOP PISTON BOOSTER AND BONNET ASSEMBLY

(71) Applicant: WORLDWIDE OILFIELD MACHINE, INC., Houston, TX (US)

(72) Inventor: Prashant N Akhare, Cypress, TX (US)

( * ) Notice: Subject to any disclaimer, the term of this patent is extended or adjusted under 35 U.S.C. 154(b) by 27 days.

(21) Appl. No.: 18/500,454

(22) Filed: Nov. 2, 2023

(65) Prior Publication Data
US 2024/0263534 A1 Aug. 8, 2024

Related U.S. Application Data

(60) Provisional application No. 63/442,832, filed on Feb. 2, 2023.

(51) Int. Cl.
*E21B 33/06* (2006.01)
*E21B 29/08* (2006.01)

(52) U.S. Cl.
CPC ............ *E21B 33/062* (2013.01); *E21B 29/08* (2013.01); *Y10T 137/5983* (2015.04)

(58) Field of Classification Search
CPC .... E21B 33/063; E21B 33/062; E21B 33/061; E21B 33/06; E21B 33/0355; E21B 29/08; Y10T 137/5983; F16K 31/1225; F16K 31/122; F16K 51/00
USPC .................................................. 251/62–63.6
See application file for complete search history.

(56) References Cited

U.S. PATENT DOCUMENTS

| | | | | |
|---|---|---|---|---|
| 3,272,222 A * | 9/1966 | Allen | .................... | E21B 33/062 251/1.3 |
| 4,437,643 A * | 3/1984 | Brakhage, Jr. | ........ | E21B 33/062 251/1.3 |
| 4,492,359 A * | 1/1985 | Baugh | .................... | E21B 33/062 251/1.3 |
| 5,590,867 A * | 1/1997 | Van Winkle | ............ | E21B 19/10 251/1.3 |
| 5,653,418 A * | 8/1997 | Olson | .................... | E21B 33/062 251/1.3 |
| 6,913,240 B1 * | 7/2005 | MacKenzie | ............. | E21B 34/16 251/63.4 |
| 7,798,466 B2 * | 9/2010 | Springett | .............. | E21B 33/062 166/85.4 |
| 8,708,309 B2 * | 4/2014 | Roper | ..................... | F16K 1/422 251/63.5 |
| 8,978,687 B2 * | 3/2015 | Lenz | ..................... | F16K 31/504 137/81.2 |
| 9,506,313 B2 * | 11/2016 | Jahnke | .................. | E21B 33/062 |
| 10,190,382 B2 * | 1/2019 | Akhare | ................ | E21B 33/063 |
| 10,378,301 B2 * | 8/2019 | Alhat | ...................... | F16K 51/00 |
| 2005/0242308 A1 * | 11/2005 | Gaydos | ................. | E21B 33/062 251/1.3 |
| 2009/0127482 A1 * | 5/2009 | Bamford | ............... | E21B 33/063 251/1.3 |
| 2015/0260306 A1 * | 9/2015 | Arnold | ................ | F16K 31/1268 251/63.6 |

* cited by examiner

*Primary Examiner* — Craig M Schneider
*Assistant Examiner* — Andrew J Rost
(74) *Attorney, Agent, or Firm* — Kenneth L. Nash; Thomas D. Nash

(57) ABSTRACT

A high power, compact BOP booster and bonnet assembly for rams and, more particularly. Solid ram change pistons or bonnet pistons are in bonnet end caps that are hydraulically controlled. The bonnet pistons move from either an open position or a closed position to urge the booster and bonnet assembly replacement and installing the BOP shear members.

12 Claims, 3 Drawing Sheets

BOP PISTON BOOSTER AND BONNET ASSEMBLY

FIELD OF THE INVENTION

The present invention relates generally to a high power BOP piston booster and bonnet assembly for assisting in accessing, repairing, or replacing BOP rams. The booster piston and bonnet assembly provides a more compact booster and bonnet assembly with solid bonnet pistons in bonnet end caps that are hydraulically controlled to allow an operator to change out the shear members.

BACKGROUND OF THE INVENTION

Blowout Preventers ("BOP") are frequently utilized in oilfield wellbore for pressure control involving shearing tubulars and closing off a wellbore. A BOP, or a BOP stack, may include a first set of rams for sealing off the wellbore and a second set of shear rams for cutting pipe such as tubing, wireline and/or intervention tools. Many different sets of rams may be utilized. BOP stacks can be quite bulky, heavy, and expensive. With increasing size, BOP stacks typically become much more expensive for initial cost as well as for installation and removal. A Booster allows use of a smaller BOP to perform the services of a larger, much more expensive, BOP.

Shear ram BOPs may frequently require maintenance after cutting pipe. In order to open the BOPs to change the shear members, hydraulic actuators located within bonnet end caps may be utilized.

BOPs utilize hydraulic pistons, referred to herein as operating pistons, to operate the rams, including the rams that utilize shearing members. The operating pistons for the BOP are often mounted between the bonnet end caps that contain hydraulic pistons utilized to open the bonnets for access to the shearing members. For this reason, the diameter of the hydraulic pistons utilized to operate the shearing pistons for these types of BOPs is limited.

To cut larger pipe than can be cut by the operating pistons utilizing the maximum or optimum practical hydraulic fluid pressure, booster piston assemblies have been utilized in the past that are utilized in addition to the operating pistons. However, when the operating pistons are positioned between the bonnet end caps, and the booster pistons are mounted axially thereto, the booster piston assemblies have been limited in size due to the bonnet end caps. Accordingly, these types of prior art booster piston assemblies are also limited in diameter, which in turn limits the amount of force that can be produced by the booster pistons.

With a high pressure booster for approximately 13 inch BOPs, the weight and the length of the Booster section put significant strain on pistons used to open the BOP to change out the rams. These pistons support the entire weight of the booster section when the BOP is opened.

The only other known prior art BOP that uses a high pressure booster (5000 psi to produce approximately 1.7 million pounds of force) does not use hydraulic pistons to open the BOP. This is a significant disadvantage that results in significant difficulties in changing out rams. Close tolerances in opening and closing interconnection components has resulted in complaints due to time and difficulty of this process.

An exemplary of U.S. Pat. No. 10,378,301 uses hydraulic pistons to open and close the BOP bonnet for changing out the rams. However, these hydraulic pistons to open the rams do not have sufficient strength to support the weight of a high pressure booster as described herein once it extends outwardly from the ram body without a problem of potential bending and damaging of the open/close hydraulic pistons, which actually also form part of the hydraulic fluid path. Also, the hydraulic pistons require use of internal fluid lines which results in reduced strength.

However, this BOP Piston Booster and related hydraulic pistons is limited in size by the hydraulic bonnet opening mechanism and therefore the prior art BOP Piston Booster is limited in the force that can be created by the booster. When the hydraulic pistons are used to open the bonnet for changing out the rams, the weight of the Piston Booster, BOP Bonnet, and so forth is supported by the BOP hydraulic pistons. A larger BOP Piston Booster is heavier and can bend the bonnet opening pistons. This would prevent the assembly from being closed and cause a very expensive problem to fix.

Other prior art BOPs used with a Piston Boosters of this size do not use hydraulic pistons to open the rams— presumably due to the stress that would be placed on the hydraulic pistons. For these, it is very difficult and time consuming to change out the rams in these BOPs because the BOP body has to be manually opened to change out the rams. Bending can also occur with manually operated bonnet opening mechanisms. Accordingly, for both these reasons manual bonnet opening mechanisms to change out the reams are a significant problem.

Other problems involve prior art bolts to secure the booster mechanism to the BOP body. The space between the bonnet end caps is limited and it is not desirable to try to run the bolts through the booster piston chamber.

The above prior art does not disclose a booster piston assembly as described in the present specification. Consequently, those skilled in the art will appreciate the present invention that addresses the above and/or other problems.

SUMMARY OF THE INVENTION

A primary objective of the present invention is to provide a BOP booster piston and bonnet assembly with solid metal bonnet pistons.

Another objective of the current invention is to provide a BOP booster piston and bonnet assembly with more compact bonnet pistons.

Yet still another objective of the present invention is to provide a BOP booster piston and bonnet assembly with hydraulically controlled bonnet pistons.

Another objective of the present invention is to provide a BOP booster piston and bonnet assembly with a more compact and lightweight booster piston and bonnet assembly.

Yet still another objective of the present invention is to provide a BOP booster piston and bonnet assembly that can be retrofitted onto existing BOP bonnets.

A further objective of the present invention is to provide a BOP booster piston and bonnet assembly where the booster is operable to provide a 5K psi rating for a 13 inch BOP.

One general aspect includes a booster piston assembly and a bonnet assembly. The booster piston assembly may also include a booster piston housing. The booster piston housing may include a booster cylinder wall that encircles a booster piston chamber. A booster base adapter may be mounted to the operating piston chamber housing. A booster piston is mounted for reciprocal movement inside the booster piston chamber. The booster piston may have a diameter greater than a diameter of the operating piston. The bonnet may include two bonnet end caps. The operating piston may be mounted between the two bonnet end caps. The two bonnet end caps may include bonnet pistons to open the bonnet for access to replace the ram. The bonnet pistons may have a sufficient length to open the bonnet for the access to replace the ram. The bonnet pistons each being of solid metallic material.

Implementations may include one or more of the following features where the booster piston assembly is mounted to the operating piston housing without use of external bolts. The booster piston assembly has a booster piston chamber. Interior bolts extend from an interior of the booster piston chamber. The interior bolts extend through the booster base to the operating piston housing. The booster piston assembly and may include recesses in the booster piston chamber to receive the interior bolts. The booster piston assembly may have a closing passageway to accept a higher pressure for closing the ram than an opening passageway to open the ram.

One general aspect includes a booster piston assembly and a bonnet assembly. The booster piston assembly also includes a booster piston housing. The booster piston housing has a booster cylinder wall that encircles a booster piston chamber. A booster base adapter may be mounted to the operating piston housing. The booster piston is mounted for reciprocal movement inside the booster piston chamber. The booster piston may have a diameter greater than a diameter of the operating piston. The booster piston housing may include a booster piston chamber. Interior bolts may extend from an interior of the booster piston chamber through the booster base to the operating piston housing. The assembly also includes recesses in the booster piston chamber to receive the interior bolts to a depth that allows the booster piston to fully stroke without engaging the interior bolts.

These and other objectives, features, and advantages of the present invention will become apparent from the drawings, the descriptions given herein, and the appended claims. However, it will be understood that above-listed objectives and/or advantages of the invention are intended only as an aid in understanding aspects of the invention, are not intended to limit the invention in any way, and therefore do not form a comprehensive or restrictive list of objectives, and/or features, and/or advantages.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
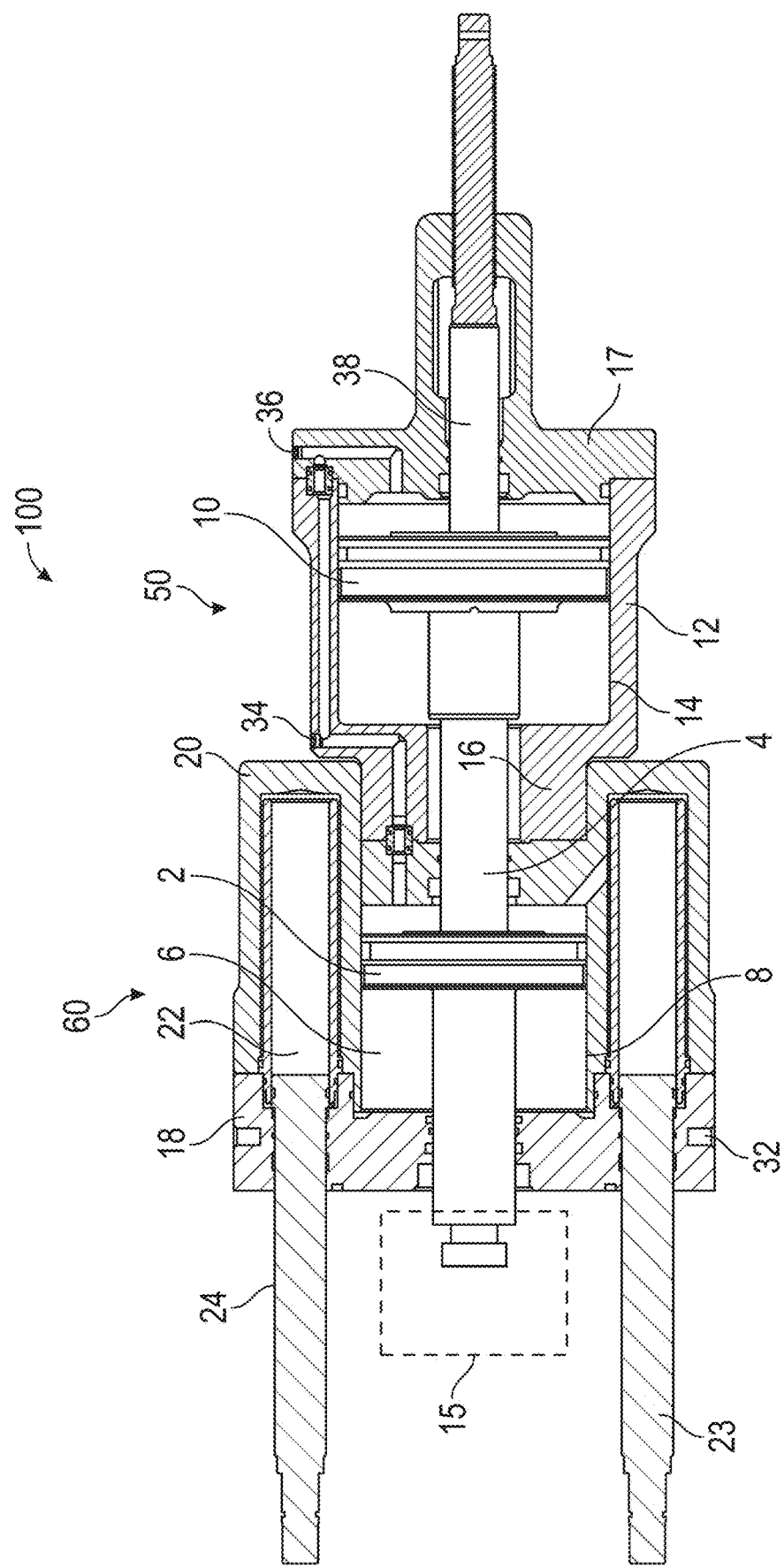
FIG. 1 shows a booster piston assembly and a bonnet assembly with solid bonnet pistons to open and close the bonnet to change out the rams.

Turning to FIG. 1, a booster piston assembly and a bonnet assembly 100 with solid bonnet pistons 24 is used to open and close the bonnet 18 to change out the rams 15 (shown schematically in FIGS. 1 and 2) in accord with one possible embodiment of the current invention. The booster assembly 100 can be retrofitted to existing 13" type U BOP bonnets. The booster 100 provides a 5K psi rating versus the standard 3 k psi boosters for a 13 inch BOP. In a preferred embodiment, the booster and bonnet assembly 100 is a compact design which reduces size and weight. In one possible embodiment, the more compact design reduces the weight from approximately 3840 lbs. to approximately 3200-3000 lbs. or approximately a 17% reduction in weight.

In a preferred embodiment, 5K psi is applied to pistons 2 and 10 to close the rams at port 36. Only 3K is used to open the pistons because less pressure is needed to open than to close. This allows different amount of thickness of metal for the passageways.

In the past, hydraulic lines have extended through the bonnet pistons as shown in U.S. Pat. No. 10,378,301 that were also used to operate the booster piston and operating piston. However, this design is not suitable for heavier loads that act on the bonnet pistons.

The bonnet and booster assembly 100 comprises of a booster assembly 50 and a bonnet assembly 60. The booster assembly may be constructed of machined metal capable of withstanding the necessary pressures for operations in a BOP stack with less metal required for 3K pressure. The booster assembly 50 comprises a booster piston 10 with booster piston shafts 38. The booster piston 10 is located inside a booster piston housing 12 defining a booster piston cylinder wall 14 that may also be referred to as booster cylinder wall. The booster piston 10 is mounted for reciprocal movement. The booster assembly 50 further comprises a booster base adapter 16 that connects the booster assembly 50 to the bonnet assembly 60. In a preferred embodiment, the booster base adapter 16 is narrower in diameter than the bonnet end caps 20 (see FIG. 3) and fits in between the bonnet end caps 20. Opposite the booster base adapter 16 is the booster housing end plate 17 which encloses the booster piston cylinder wall 14 and booster piston chamber 39 (See FIG. 2).

The bonnet assembly 60 comprises bonnet end caps 20 that include chamber 22 and bonnet pistons 24. The bonnet pistons 24 move from an open position (as shown in FIG. 1) to a closed position by traversing laterally within the bonnet piston chamber 22. As fluid is urged into the bonnet piston chamber 22, the fluid exerts force on the piston to urge the piston to the open position or outwardly towards the BOP such that the booster and bonnet assembly 100 is then also moved away from the BOP. The full weight of the assembly 100 is held by the bonnet piston shafts or change piston shafts 23. The bonnet piston slides along the exterior surface 24. The solid metal shafts 23 allow for increased weight so they hold the weight of assembly 100 while changing the BOP rams. Further, the ram change pistons or shafts 23 are shortened and thickened relative to hollow shafts as discussed in the above patent increasing rigidity and decreasing or eliminating any bend of the ram change piston 23.

The bonnet assembly further comprises an operating piston 2 mounted within operating piston chamber 6. The operating piston chamber 6 is enclosed by an operating piston chamber outer wall 8. Recesses 29 are within the booster piston chamber to accept interior bolts 28 for securing the booster piston assembly 50 to bonnet assembly 60 (See FIG. 2). The recesses 29 are deep enough to allow for full stroke of piston 10 without interference with bolts 28. The bolts 28 screw into the operating piston housing 26 using threads 27. As hydraulic pressure is applied behind the booster piston 10, the booster piston 10 engages the operating piston shaft 4 and in turn urges the operating pistons to engage the BOP piston shaft for operation in the closed position. The reverse hydraulic flow urges the operating piston 2 and to engage the booster piston 10 outward relative the BOP during opening operations.

In a preferred embodiment, the booster and bonnet assembly 100 is also reduced in overall length as well having solid bonnet pistons or ram change pistons 22. The stroke lengths for the solid shafts 23 are less than those of hollow shafts. In one possible embodiment, the ram change piston stroke length can be reduced from 22 inches to approximately 17 inches. This reduced stroke length further provides a reduced center of gravity which decreases the possibility of the shafts 23 bending when the booster and bonnet assembly 100 is in the open position.

In one possible embodiment, the solid ram change pistons 24 have additionally been increased in diameter size to provide increased strength. For example, the ram shafts 23 are increased in diameter from 2.5 inches to 3 inches.

Using hydraulics to load and unload the rams removes prior art issues of lining up the bonnet and booster assemblies, the BOP, and the rams. The ram change pistons 23 are loaded or unloaded hydraulically instead of manually which allows for quicker and more efficient loading and unloading for changing the BOP rams/cutters. The solid shafts 23 provide superior strength to support the entire weight of the booster and bonnet assembly 100.

Due to the solid piston design, the hydraulic lines are external. Hydraulic pressure applied at chamber 22 operates pistons 24. This allows space internally for a larger diameter ram change piston 24 to be used. The ram change piston 24 being solid provides an advantage versus prior art telescoping bolts which are prone to bending, warping, or the like as well as alignment issues thereby which otherwise increase issues when the BOP rams need to be accessed.

Figure 2:
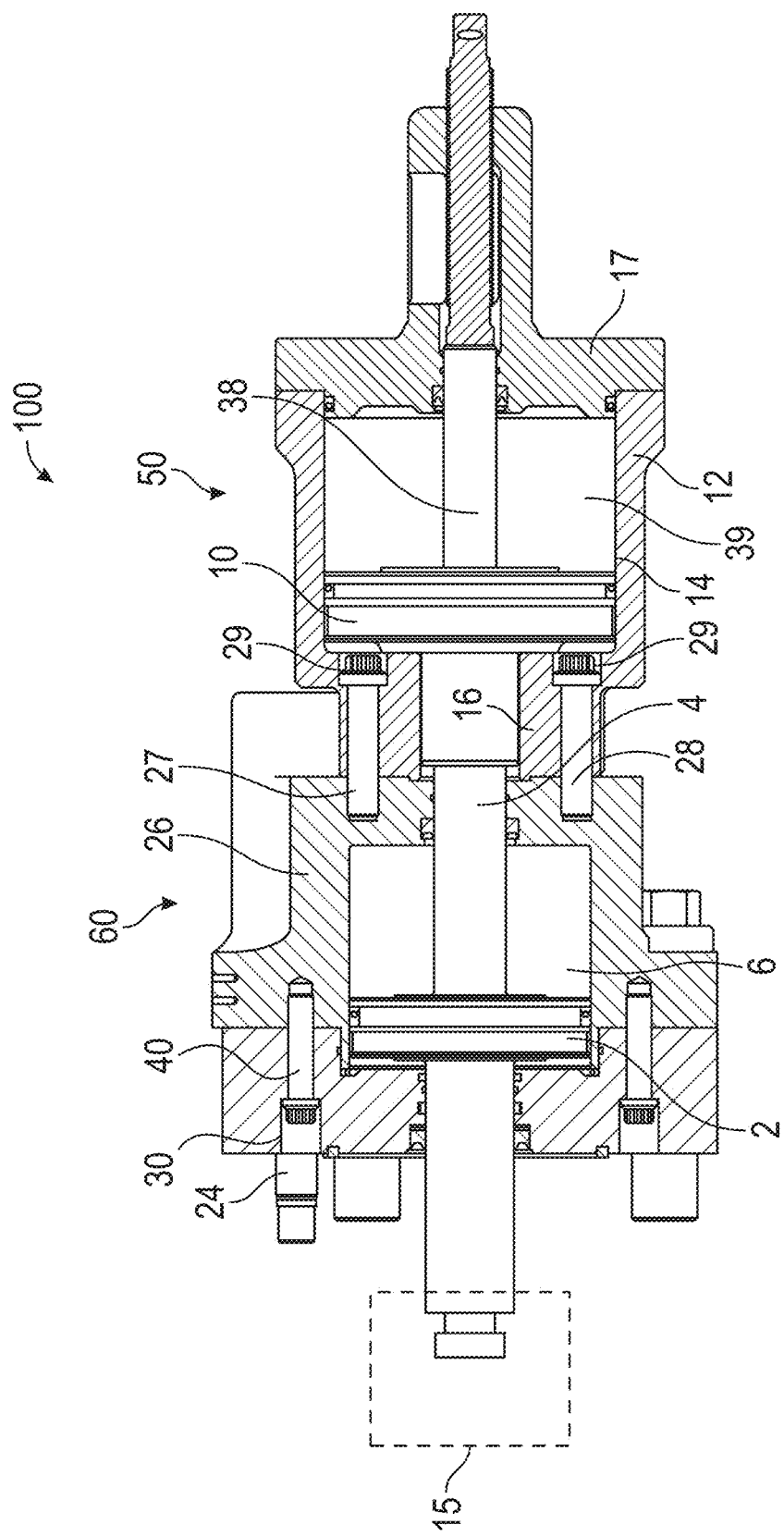
FIG. 2 shows a booster piston assembly connected to the operating piston chamber outer wall without external bolts instead using bolts that extend from recesses in the booster piston chamber through the base and into the operating piston chamber outer wall.

Now referring to FIG. 2, a booster piston assembly 50 is shown connected to the bonnet assembly 60 without external bolts. The booster base adapter 16 engages the booster piston housing 12 where recesses 29 within the base adapter 16 is operable for interior bolts 28 to be installed and fastened to the bonnet assembly 60. Using interior bolts 28 that extend from recesses 29 in the booster piston housing 12 and into operating piston housing 26 provides a more compact overall booster and bonnet assembly 100 according to one possible embodiment of the current invention. The bolts 40 connecting the operating piston housing 26 to the bonnet 18 are internal rather than external. The bolts 40 are located internally allow for a more compact booster assembly thereby reducing the overall length and weight of the booster and bonnet assembly 100.

In one possible embodiment, the booster piston 10 is larger in diameter than the operating piston 2. The booster piston 10 is also larger than the diameter between the ram change pistons 24 and bonnet end caps 20. Therefore, the booster piston housing 12 is located outside of the diameter between the bonnet end caps 20.

The booster piston 10 and operating piston 2 together are operable to provide over approximately 1.68 million lbs. force. As hydraulic fluid is urged behind the booster piston 10 and operating piston 2, the fluid provides enough force to urge the rams to the closed position such that a BOP can shear any pipe, tubing, wire line, or the like within the BOP bore. As the BOP cutters or rams are used, they may need to be serviced and replaced. The hydraulically controlled bonnet ram change pistons 24 then provide a substantial advantage in the field allowing an operator to quickly and efficiently move the booster and bonnet assembly 100 away from a BOP to allow access to the BOP rams/cutters.

Figure 3:
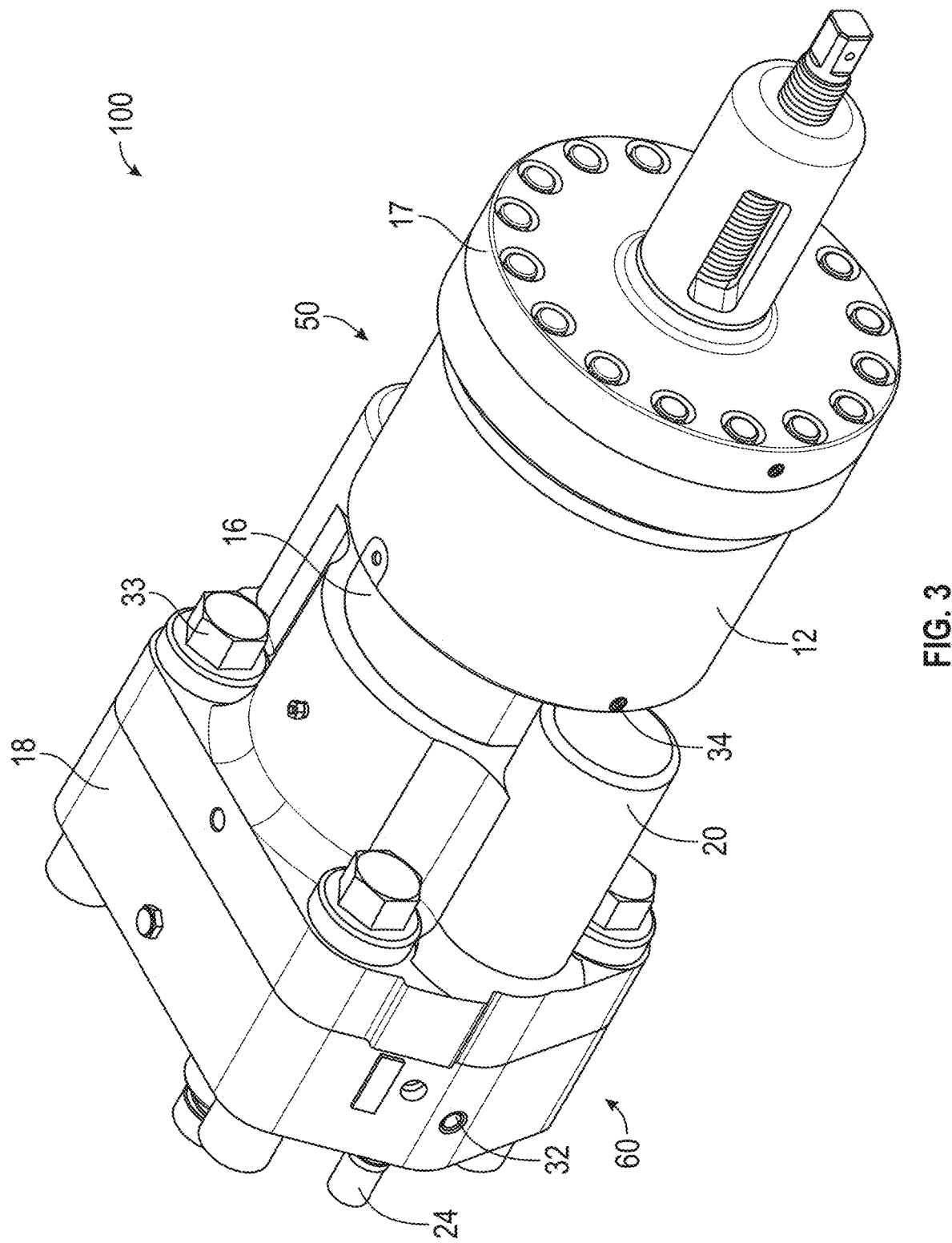
FIG. 3 shows a booster piston assembly and a bonnet assembly with bonnet bolts to secure the bonnet assembly to a ram body.

Turing to FIG. 3, a booster piston assembly and a bonnet assembly 100 is shown with bonnet bolts 33 to secure the bonnet piston housing 12 to a ram body (not shown) in accord with one possible embodiment of the current invention. In one possible embodiment, open and close ports 32, 34 for hydraulic fluid to the ram change pistons 24 are external hydraulic lines, ports, or connections 36 which are located on the bonnet 18 and booster housing 12. This is done to allow for more room for the ram change piston shafts 23. Additionally, the hydraulic fluid can be used for both ram change pistons 24 at the same time to allow for clearing space to remove or install a ram in the BOP.

In one possible embodiment, the open side hydraulic port 32 for the ram pistons 24 is operable to provide 3 k psi while the closed side port 34 is operable to provide 5 k psi. An increase pressure on the closed side port 34 allows for stronger pressure to be applied while closing the rams. The closed side port 34 is located on the bonnet 18 whereas the open side port is located on the intermediate. Once pressure is applied on the closed side port 34, that pressure passes behind the ram change pistons 24 to urge the pistons to the closed position, and in turn moving the booster and bonnet assembly 100 flush with the BOP housing.

Due to the variation in pressure between the open and closed ports, there is a different thickness of metal used in the open and close circuits due to the difference in pressure rating of 5000 psi v 3000 psi. The closed port is constructed with thicker metal to compensate for the higher pressure. This unique construction allows for the booster and bonnet assembly to provide 5 k psi while still fitting on a 13" BOP.

In summary, when the booster and bonnet assembly 100 is in the open position (See FIG. 1) the ram change pistons 24 are fully extended thereby allowing the booster assembly 100 to be extended away from the BOP so that the BOP rams may be changed. This provides an advantage over a manually telescoping studs that make it difficult to remove the booster assembly from the BOP bonnet. Additionally, due to the precise tolerance of the rams, manually loading and unloading the rams increases the difficulty in the field over using hydraulics in ram change operations. For instance, the tolerance in the ram cavity may be just 4/1000" so that a pressure of 1000 psi may be necessary to slide the block within the ram cavity. This increases the time and cost when changing the rams. Therefore, those skilled in the art will appreciate will appreciate solid ram change pistons allowing hydraulically changing of BOP rams.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A booster piston and bonnet assembly, a ram and an operating piston to move said ram between an open position and a closed position, an operating piston housing containing said operating piston, said booster piston and bonnet assembly comprising:
   a booster piston housing defining therein a booster piston chamber;
   a booster base adaptor;
   a booster piston mounted for reciprocal movement inside said booster piston chamber, said booster piston being connected to assist said operating piston to move said ram between said open position and said closed position, said booster piston comprising a diameter greater than a diameter of said operating piston; and
   a bonnet comprising two bonnet end caps, each of said two bonnet end caps comprising a bonnet piston chamber defined therein, said operating piston being mounted between said two bonnet end caps, a bonnet piston mounted within each bonnet piston chamber, each said bonnet piston being responsive to hydraulic fluid applied to each said bonnet piston chamber to open said bonnet for access to said ram, each said bonnet piston comprising a sufficient length to open said bonnet for said access to said ram, each said bonnet piston being comprised of solid metallic material.

2. The booster piston and bonnet assembly of claim 1 wherein said booster piston housing is mounted to said operating piston housing without use of external bolts, said booster base adaptor extends from said booster piston housing to said operating piston housing, said booster base adaptor forms an end of said booster piston chamber so that a surface of said booster base adaptor is exposed to hydraulic fluid within said booster piston chamber, said surface of said booster base adaptor defining recesses therein to receive interior bolts.

3. The booster piston and bonnet assembly of claim 1 further comprising interior bolts that extend from an interior of said booster piston chamber through said booster base adaptor to said operating piston housing, a booster cylinder wall of said booster piston housing, said booster cylinder wall and said booster base adaptor being of one-piece metallic construction.

4. The booster piston and bonnet assembly of claim 3 further comprising recesses in said booster base adaptor to receive said interior bolts.

5. The booster piston and bonnet assembly of claim 1 further comprising a closing passageway and an opening passageway in communication with said booster piston, said closing passageway being constructed to accept a higher pressure for closing said ram than said opening passageway to open said ram.

6. The booster piston and bonnet assembly of claim 1 further comprising a closing passageway constructed to accept a higher pressure for closing said ram than an opening passageway for opening said ram.

7. A booster piston and bonnet assembly, a ram and an operating piston to move said ram between an open position and a closed position, an operating piston chamber housing containing said operating piston, said booster piston and bonnet assembly comprising:
   a booster piston housing defining therein a booster piston chamber;
   a booster base adaptor;
   a booster piston mounted for reciprocal movement inside said booster piston chamber, said booster piston being connected to assist said operating piston to move said ram between said open position and said closed position, said booster piston comprising a diameter greater than a diameter of said operating piston;
   interior bolts that extend from an interior of said booster piston chamber, said interior bolts extending through said booster base adaptor to said operating piston housing; and
   recesses in said booster piston chamber to receive said interior bolts to a depth that allows the booster piston to fully stroke without engaging said interior bolts.

8. The booster piston and bonnet assembly of claim 7 wherein said booster base adaptor extends to said operating piston housing, said booster base adaptor also forms an end of said booster piston chamber so that a surface of said booster base adaptor is exposed to hydraulic fluid within said booster piston chamber, said surface of said booster base adaptor defining said recesses.

9. The booster piston and bonnet assembly of claim 7 further comprising a booster cylinder wall, said booster cylinder wall and said booster base adaptor being of one-piece metallic construction.

10. The booster piston and bonnet assembly of claim 9 further comprising said booster base adaptor defines said recesses to receive said interior bolts.

11. A booster piston and bonnet assembly, a ram and an operating piston to move said ram between an open position and a closed position, an operating piston housing containing said operating piston, said booster piston and bonnet assembly comprising:
   a booster piston housing;
   a booster piston mounted for reciprocal movement inside said booster piston housing to assist said operating piston to move said ram between said open position and said closed position, said booster piston comprising a diameter greater than a diameter of said operating piston; and
   a closing passageway and an opening passageway in fluid communication with said booster piston, said closing passageway being constructed to control a higher pressure for closing said ram than said opening passageway to open said ram.

12. The booster piston and bonnet assembly of claim 11 wherein said closing passageway and said opening passageway are also in fluid communication with said operating piston.

* * * * *